US006751317B2

(12) United States Patent
Shima et al.

(10) Patent No.: US 6,751,317 B2
(45) Date of Patent: *Jun. 15, 2004

(54) MOVABLE TERMINAL, COAXIAL CONNECTOR, AND COMMUNICATION APPARATUS INCORPORATING THE SAME

(75) Inventors: Kazuo Shima, Kanazawa (JP); Chikara Uratani, Kanazawa (JP); Yuichi Maruyama, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 355 days.

This patent is subject to a terminal disclaimer.

(21) Appl. No.: 09/756,630

(22) Filed: Jan. 8, 2001

(65) Prior Publication Data

US 2001/0050983 A1 Dec. 13, 2001

(30) Foreign Application Priority Data

Jan. 7, 2000 (JP) ...................................... 2000-001916

(51) Int. Cl.$^7$ ................................................ H04M 1/00
(52) U.S. Cl. ..................................................... 379/438
(58) Field of Search ........................... 379/438, 433.02; 439/246, 248, 188, 63, 578

(56) References Cited

U.S. PATENT DOCUMENTS

| | | | |
|---|---|---|---|
| 5,139,427 A | | 8/1992 | Boyd et al. |
| 5,281,176 A | | 1/1994 | Yahagi et al. |
| 5,575,690 A | | 11/1996 | Eaton |
| 5,625,177 A | | 4/1997 | Yukinori et al. |
| 6,068,492 A | * | 5/2000 | Uratani et al. ................ 439/63 |
| 6,099,334 A | | 8/2000 | Togashi |
| 6,554,630 B2 | | 4/2003 | Uratani |

FOREIGN PATENT DOCUMENTS

| | | |
|---|---|---|
| EP | 0 929 128 A1 | 7/1999 |
| JP | 10-188738 A | 7/1998 |
| JP | 11-265761 A | 9/1999 |
| JP | 11-307188 A | 11/1999 |
| JP | 2001-176612 A | 6/2001 |
| WO | WO 95/30258 | 11/1995 |

* cited by examiner

*Primary Examiner*—Jack Chiang
(74) *Attorney, Agent, or Firm*—Keating & Bennett, LLP

(57) ABSTRACT

A movable terminal and a coaxial connector have greatly improved durability and have outstanding contact/connection reliability, and are included in a communication apparatus. A coaxial connector includes a two-split synthetic resin case having a lower insulating case and an upper insulating case, a metal fixed terminal, a movable terminal, and an external terminal. The movable terminal having a spring movable function includes a movable contact portion with which the fixed terminal makes contact, a fixed portion fit in the upper and lower insulating cases, and a lead portion bent in an L-shape. The movable contact portion has a frame-shaped portion, a spring movable portion upwardly curved in an arcuate shape, and a contact portion provided at the approximate center of the spring movable portion.

20 Claims, 5 Drawing Sheets

MOVABLE TERMINAL, COAXIAL CONNECTOR, AND COMMUNICATION APPARATUS INCORPORATING THE SAME

BACKGROUND OF THE INVENTION

1. Field of the Invention

The present invention relates to movable terminals, coaxial connectors, and communication apparatuses incorporating the same.

2. Description of the Related Art

Conventionally, mobile communication apparatuses such as mobile phones, incorporate surface-mount-type coaxial connectors having signal-path switching functions. In such a coaxial connector, a resin case, a fixed terminal, and a movable terminal having spring properties are integrally insert-molded.

As shown in FIG. 12, a conventional movable terminal 155 includes a movable portion 151 having a spring function and a lead portion 152 bent in a substantially U-shaped configuration connected to the movable portion 151. The movable portion 151 includes an arm 151*a* extending to right and left side portions from the lead portion 152, two spring supporting portions 151*b* provided at the ends of the arm 151*a*, a spring movable portion 151*c* extending parallel to the arms 151*a* such that the portion 151*c* straddles the spring supporting portions 151*b*, and a contact portion 151*d* protruding from the spring movable portion 151*c*. Both ends of the spring movable portion 151*c* are supported and fixed by the spring supporting portions 151*b*. The central portion of the spring movable portion 151*c* is curved in an arcuate shape to expand upwardly. With the force exerted by the spring property of the arcuate shaped spring mechanism, the contact portion 151*d* abuts against the lower surface of a contact portion 141 of a fixed terminal 140, and thereby the fixed terminal 140 makes contact with the movable terminal 155 to connect each other.

However, the conventional movable terminal 155 includes only one arm 151*a* and only two bent portions A and B. As a result, when the conventional movable terminal 155 is repeatedly pressed into contact with the central contact of the counterpart coaxial connector, plastic deformation of the movable terminal 155 occurs, thereby deteriorating the spring property. That is, after removing the counterpart coaxial connector, the fixed terminal 140 and the movable terminal 155 do not make firm contact, and therefore the connection therebetween is inadequate. In some cases, both terminals 140 and 155 do not make contact.

SUMMARY OF THE INVENTION

To overcome the above-described problems with the prior art, preferred embodiments of the present invention provide a movable terminal and a coaxial connector which are durable and which have excellent contact/connection reliability, and a communication apparatus incorporating the same.

Preferred embodiments of the present invention provide a movable terminal including a frame-shaped portion, a spring movable portion having both ends supported by the frame-shaped portion and having a displaceable central spring portion, and a contact portion integrally provided with the spring movable portion and making contact with a fixed terminal such that the contact portion is connected to the fixed terminal, in which two arms arranged substantially parallel to the spring movable portion of the frame-shaped portion are bent such that the spring movable portion is curved in an arcuate shape.

Preferably, the contact portion is provided above the arcuate shaped spring movable portion.

Other preferred embodiments of the present invention provide a coaxial connector including an insulating case having a cavity in which an approximately central contact of a counterpart coaxial connector is inserted, the movable terminal disposed in the cavity of the insulating case such that the movable terminal protrudes in a direction substantially perpendicular to a direction in which the approximately central contact is inserted, a fixed terminal disposed in the cavity of the insulating case to make contact with a contact portion of the movable terminal such that the fixed terminal is connected to the contact portion, and an external terminal disposed on the outside of the insulating case to electrically connect an external conductor of the counterpart coaxial connector, in which the contact portion of the movable terminal and the fixed terminal are separate from each other and make contact with one another to connect each other in accordance with the installation and removal of the counterpart coaxial connector.

Since the frame-shaped portion has outstanding mechanical strength, the plastic deformation of the movable terminal does not occur when the movable terminal is repeatedly pressed into contact with the approximately central contact of the counterpart coaxial connector. As a result, the deterioration of spring property is prevented. Moreover, the spring movable portion is curved in the arcuate shape by bending a flat plate instead of by plastic deformation. Thus, plastic deformation is unlikely to occur.

In addition, other preferred embodiments of the present invention provides a communication apparatus incorporating the above coaxial connector, thereby having high reliability.

Other features, elements, characteristics and advantages of the present invention will become more apparent from the detailed description of preferred embodiments thereof with reference to the drawings.

DETAILED DESCRIPTION OF PREFERRED EMBODIMENTS

With reference to the attached drawings, a description will be provided of a movable terminal, a coaxial connector, and a communication apparatus according to preferred embodiments of the present invention.

Figure 1:
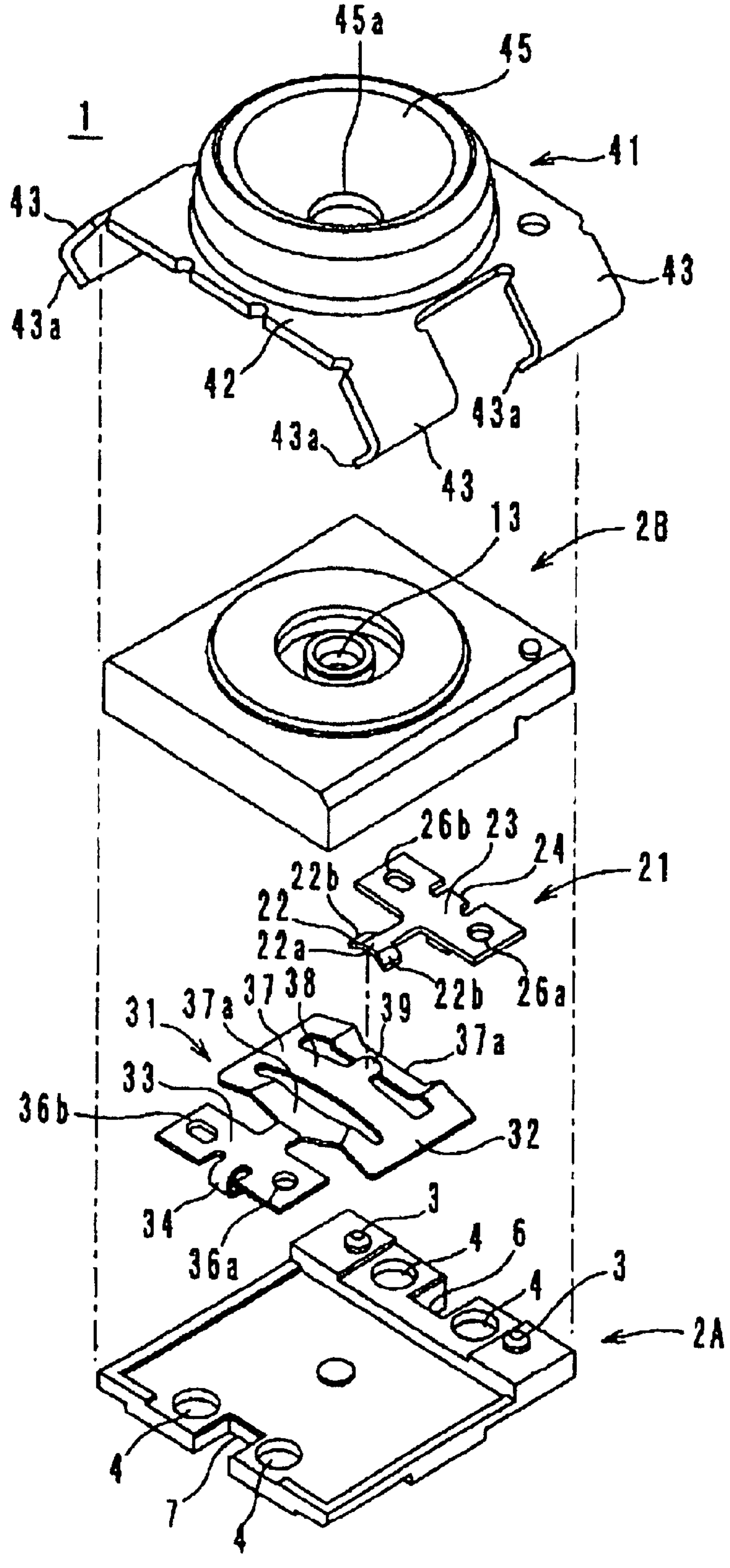
FIG. 1 is an exploded perspective view showing a preferred embodiment of a coaxial connector according to the present invention.
Figure 2:
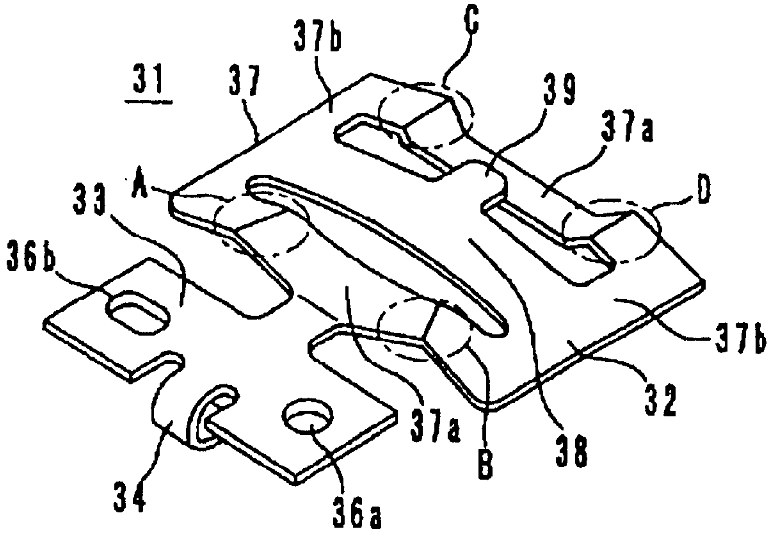
FIG. 2 is an enlarged perspective view of a movable terminal shown in FIG. 1.
Figure 3:
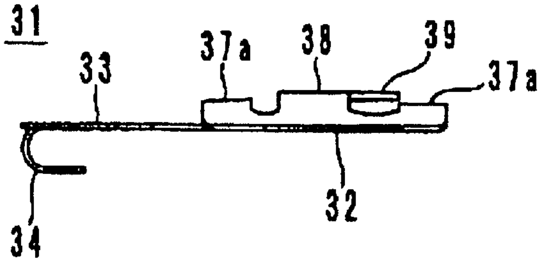
FIG. 3 is a front view of the movable terminal shown in FIG. 2.
Figure 4:
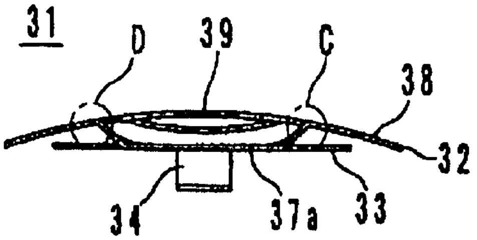
FIG. 4 is a right side-surface view of the movable terminal shown in FIG. 2.
Figure 5:
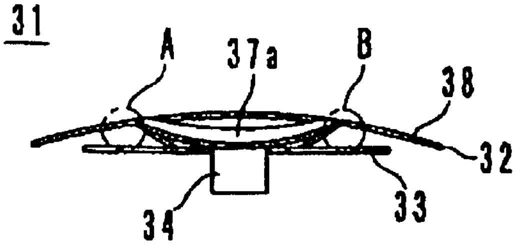
FIG. 5 is a left side-surface view of the movable terminal shown in FIG. 2.

FIG. 1 is an exploded perspective view showing the structure of a coaxial connector according to a first preferred embodiment of the present invention. A coaxial connector (coaxial receptacle) 1 preferably includes a synthetic resin insulating case split into a lower insulating case 2A and an upper insulating case 2B, a metal fixed terminal 21, a metal movable terminal 31, and a metal external terminal (an external conductor) 41.

The lower insulating case 2A has a substantially rectangular shape. At each of the two corners of one side of the upper surface (a split surface) of the lower insulating case 2A, a guide protrusion 3 to position the upper insulating case 2B is provided. Near each of the guide protrusions 3 and on another side opposing the one side, cavity-like leg-receiving portions 4 to fit the legs (not shown) of the upper insulating case 2B are provided. In addition, substantially rectangular cut-away portions 6 and 7 are provided at approximately central portions of the mutually opposing edges of the lower insulating case 2A. The cut-away portion 6 contains a lead portion 24 (which will be described below) of the fixed terminal 21. The cut-away portion 7 contains a lead portion 34 (which will be described below) of the movable terminal 31. The dimensions of the cut-away portions 6 and 7 are set such that a clearance is provided which is sufficient for preventing influence of the capillary effect due to the flux of solder used for mounting between the lower insulating case 2A and the lead portion 24 of the terminal 21 and the lead portion 34 of the terminal 31.

The upper insulating case 2B is substantially rectangular. An entrance hole 13 having a substantially round cross-section is provided in the approximate center of the upper insulating case 2B. The entrance hole 13 penetrates the upper insulating case 2B. The approximately central contact of a counterpart coaxial connector is inserted into the entrance hole 13.

In addition, four round legs are provided on the bottom surface (the other split surface) of the upper insulating case 2B. These legs are not shown in the figure. A groove 15 (see FIG. 7) having a substantially V-shaped cross-section is provided between the entrance hole 13 and an edge on which the fixed terminal 21 is led out. The groove 15 extends in a direction substantially perpendicular to the direction in which the fixed terminal 21 is led out.

Even though there is clearance provided between the lower insulating case 2A and the lead portion 24 of the terminal 21 and the lead portion 34 of the terminal 31, when mounting solder is excessively applied, a solder flux enters from spaces between the insulating cases 2A and 2B and the terminals 21 and 31. Thus, the groove 15 crossing the fixed terminal 21 is disposed on the split surface of the upper insulating case 2B. This groove 15 provides sufficient clearance to prevent capillary effect occurring between the insulating cases 2A and 2B and the fixed terminal 21. As a result, the flux does not enter.

The fixed terminal 21 is preferably formed by punching and bending a metal plate, such as a flat stainless steel plate. The fixed terminal 21 is defined by a contact portion 22 with which the movable terminal 31 comes into contact, a fixed portion 23 sandwiched by the insulating cases 2A and 2B, and a lead portion 24 bent into a substantially L-shaped configuration. Both sides of the contact portion 22 are folded at desired angles to define a horizontal surface 22*a* and inclined surfaces 22*b* on each side of the horizontal surface 22*a*.

A round hole 26*a* and an oval hole 26*b* are provided on both sides of the fixed portion 23. The legs of the upper insulating case 2B are fitted into the holes 26*a* and 26*b*, and the fixed terminal 21 is attached with the upper insulating case 2B with outstanding positional accuracy with reference to the round hole 26*a*. The hole 26*b* has a substantially oval shape to allow for production margin errors. The fixed terminal 21 is attached such that the horizontal face 22*a* of the contact portion 22 and the fixed portion 23 are in close contact with the bottom of the upper insulating case 2B. In addition, a clearance is provided at a portion where the fixed terminal 21 crosses the groove 15.

The lead portion 24 extends downwardly substantially parallel to a side surface of the lower insulating case 2A. The top end of the lead portion 24 is bent inwardly at an angle of substantially 90 degrees such that the top portion is flush with the bottom surface of the lower insulating case 2A. The lead portion 24 functions as a soldering portion.

The movable terminal 31 is formed preferably by punching and bending a metal plate, such as a stainless steel plate having spring property in a desired shape. As shown in FIGS. 2 to 5, the movable terminal 31 is defined by a movable contact portion 32 having a spring movable function and functions as a contact point with the fixed terminal 21, a fixed portion 33 attached in the insulating cases 2A and 2B, and a lead portion 34 bent into a substantially L-shaped configuration. The movable contact portion 32 includes a frame-shaped portion 37, a spring movable portion 38 wherein both ends are supported by the frame-shaped portion 37, and a contact portion 39 provided at the approximate center of the spring movable portion 38.

The structure of the substantially rectangular frame-shaped portion 37 has outstanding mechanical strength such that plastic deformation does not occur. Specifically, the frame-shaped portion 37 includes at least two spring supporting portions 37*b* connecting to the spring movable portion 38 and extending in a direction that is substantially perpendicular to the spring movable portion 38, and at least two arms 37*a* arranged substantially parallel to the spring movable portion 38. The spring movable portion 38 curves such that the portion 38 bulges upwardly in an arcuate shape, and has a desired height at the top thereof. The contact portion 39 is provided on the top of the spring movable portion 38 curved in the arcuate shape.

The curve of the spring movable portion 38 is provided by folding the two arms 37*a* at four positions A, B, C, and D such that the approximate centers of the two arms 37*a* bulge downwardly. Thus, the spring movable portion 38 maintains the curve obtained by bending a flat plate without plastic deformation. As a result, when the counterpart coaxial connector is installed and displaced, the spring movable portion 38 reverts back to an initial flat configuration. Therefore, even though attachment and detachment of the counterpart coaxial connector are repeated, the plastic deformation of the spring movable portion 38 does not occur.

A round hole 36*a* and an oval hole 36*b* are provided on both sides of the fixed portion 33. The holes 36*a* and 36*b* are fitted into the legs of the upper insulating case 2B, and the movable terminal 31 is attached to the upper insulating case 2B with outstanding positional accuracy. In this case, the movable terminal 31 is attached such that the fixed portion 33 is adjacent to the bottom of the upper insulating case 2B.

The lead portion 34 extends downwardly substantially parallel to a side of the lower insulating case 2A. The top end of the lead portion 34 is bent inwardly at an angle of about 90 degrees such that the top end thereof is flush with the bottom of the lower insulating case 2A to be used as a soldering portion.

The external terminal 41 in contact with the external conductor of the counterpart coaxial connector is preferably formed by punching, bending, and drawing a plate of metal such as brass and spring phosphor bronze. A flat portion 42 of the approximate center of the plate is disposed over the upper surface of the upper insulating case 2B. A leg 43 is disposed at each of the four corners of the flat portion 42. The legs 43 are folded along the side surfaces and bottom surface of an assembly defined by the terminals 21 and 31 and the insulating cases 2A and 2B. With this arrangement, the assembly has a rigid structure. In addition, top end portions 43*a* of the legs 43 are arranged such that the portions 43*a* are substantially flush with the bottom of the lower insulating case 2A, and are used as soldering portions.

At the approximate center of the flat portion 42, a through-hole cavity 45 is provided such that the through-hole cavity 45 is concentric with the round entrance hole 13 of the upper insulating case 2B. The through-hole cavity 45 includes a conical opening, and a round hole 45*a* is provided at the approximate center thereof. The external conductor of the counterpart coaxial connector is fitted into the through-hole cavity 45. The external terminal 41 is usually used as a ground. The external surface of the external terminal 41 is plated when necessary.

Figure 6:
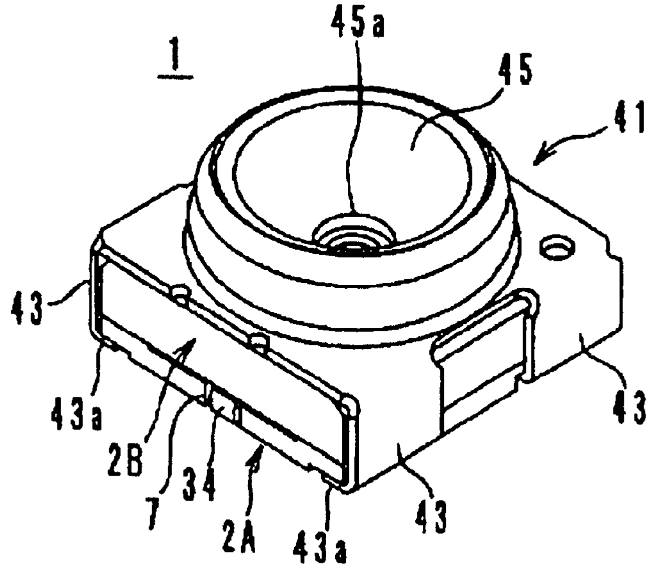
FIG. 6 is a perspective view showing the appearance of the coaxial connector shown in FIG. 1.
Figure 7:
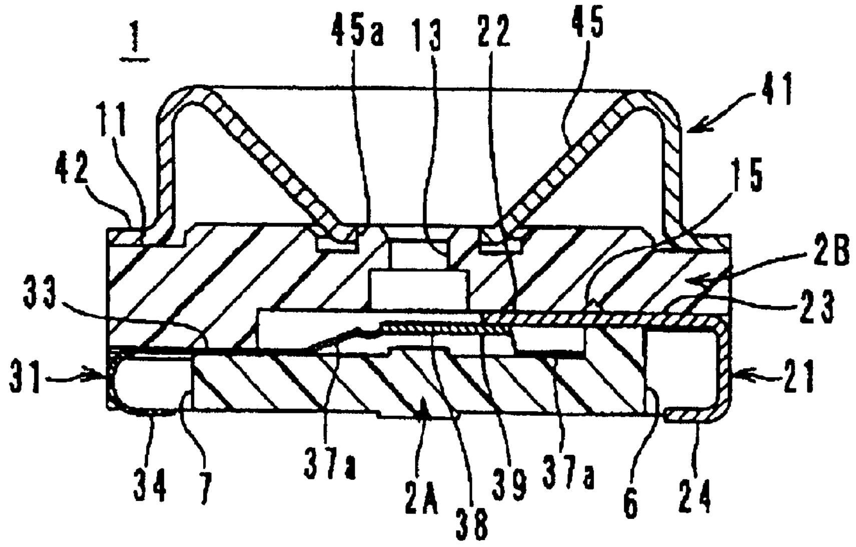
FIG. 7 is a sectional view of the coaxial connector shown in FIG. 6.

FIG. 6 shows a perspective view of the appearance of a coaxial connector 1 assembled in the above manner. FIG. 7 shows a sectional view thereof. As shown in FIG. 7, in the coaxial connector 1, the top end portions of the terminals 21, 31, and 41 are configured to be substantially flush with the bottom of the lower insulating case 2A, thereby defining a surface-mountable structure. In addition, because the through-hole cavity 45 is provided in the external terminal 41, a stable and reliable connection is achieved with the counterpart coaxial connector.

The fixed terminal 21 and the movable terminal 31 are arranged such that the fixed terminal 21 is disposed above the movable terminal 31 in the inside space of an insulating-case structure defined by the insulating cases 2A and 2B. The movable contact portion 32 of the movable terminal 31 is arranged substantially horizontally in the inside space of the insulating-case structure. That is, the movable contact portion 32 is arranged in a direction substantially perpendicular to a direction in which the central contact of the counterpart coaxial connector is inserted.

Next, the function of the coaxial connector 1 will be illustrated with reference to FIGS. 7 to 10.

Figure 8:
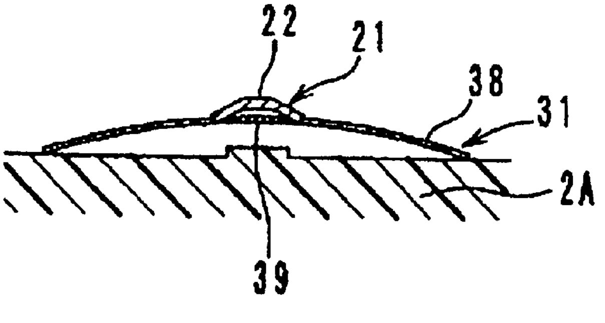
FIG. 8 is a schematic sectional view for illustrating the spring function of a spring movable portion of the movable terminal.

As shown in FIGS. 7 and 8, when the counterpart coaxial connector is not attached, the approximately central portion of the spring movable portion 38 is upwardly expanded. In this state, the movable terminal 31 is in contact with the fixed terminal 21 by the urging force of the spring movable portion 38, and both terminals 21 and 31 are electrically connected to each other.

Figure 9:
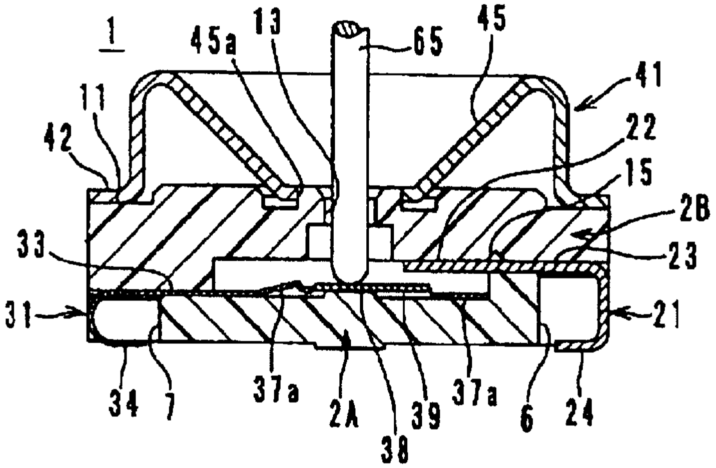
FIG. 9 is a sectional view obtained when a counterpart coaxial connector is fitted in the coaxial connector shown in FIG. 6.
Figure 10:
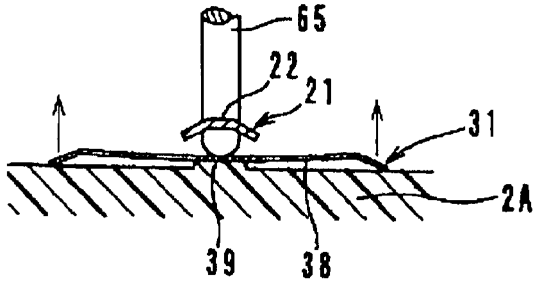
FIG. 10 is a schematic sectional view for illustrating the spring function of the spring movable portion of the movable terminal in the above situation.

In contrast, as shown in FIGS. 9 and 10, when the counterpart coaxial connector is attached, the approximately central portion of the spring movable portion 38 is pressed down by the approximately central contact 65 of the counterpart coaxial connector inserted from the upper entrance hole 13, and the approximately central portion thereof is expanded downwardly in an arcuate shape. In this situation, the contact portion 39 of the movable terminal 31 separates from the contact portion 22 of the fixed terminal 21 and thereby the fixed terminal 21 and the movable terminal 31 are electrically disconnected, while the approximately central contact 65 and the movable terminal 31 are electrically connected. At the same time, the external conductor (not shown) of the counterpart coaxial connector is fitted into the external terminal 41, and thus are electrically connected to each other.

Figure 12:
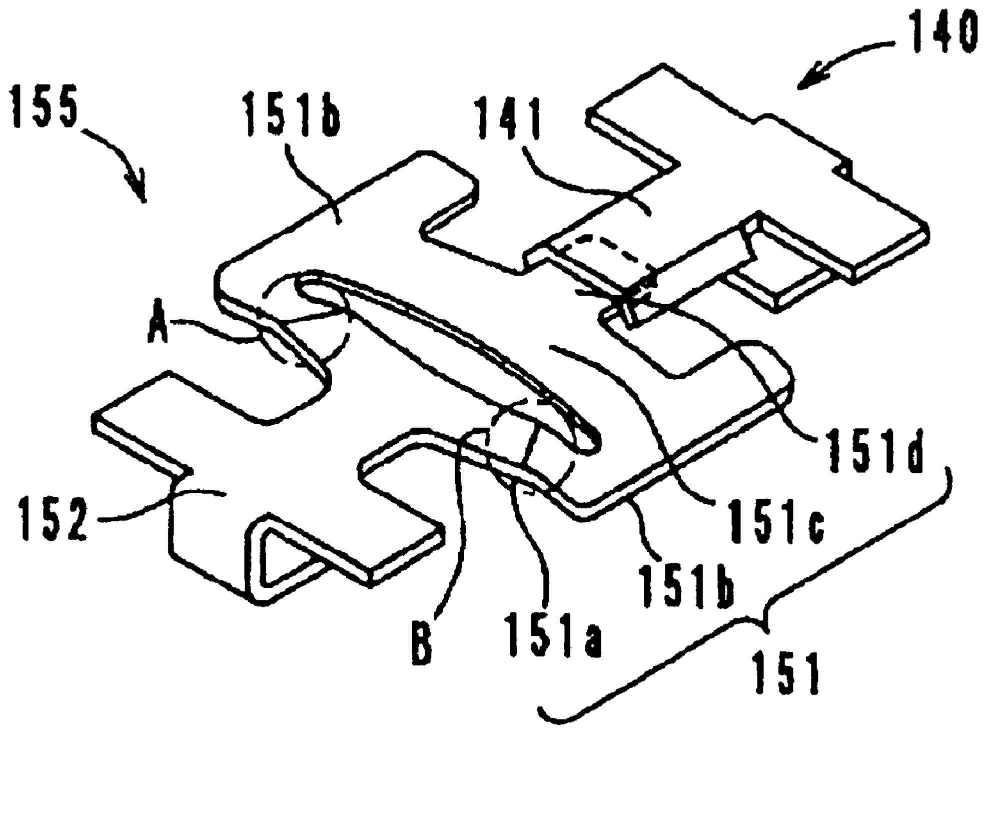
FIG. 12 PRIOR ART
FIG. 12 is a perspective view showing a conventional movable terminal and a conventional fixed terminal.

In the above situation, a reactive force occurs on both ends of the spring movable portion 38 (see FIG. 10). The reactive force is supported by the frame portion 37, particularly, by the folded portions A, B, C, and D provided on the two arms 37*a*. That is, as compared with the conventional movable terminal having only two folded portions shown in FIG. 12, the movable terminal 31 of the first preferred embodiment has the four folded portions A, B, C, and D. As a result, the load of the reactive force applied to each of the folded portions is greatly reduced. Thus, even though the movable terminal 31 is repeatedly pressed in contact with the approximately central contact 65 of the counterpart coaxial connector, and such a contact is continuously repeated for a long time, plastic deformation of the movable terminal 31 does not occurs and thereby the spring property of the movable terminal 31 does not deteriorate.

Furthermore, even if an excessive force is applied to the spring movable portion 38 when the counterpart coaxial connector is attached, since the lowest portion of the spring movable portion 38 comes in contact with the upper surface of the lower insulating case 2A, the displacement of the spring movable portion 38 does not exceed a prescribed amount.

When the counterpart coaxial connector is removed from the coaxial connector 1, the approximately central portion of the spring movable portion 38 returns to an upwardly bulged state via the spring property. In this state, the fixed terminal 21 and the movable terminal 31 are electrically connected to each other, while the approximately central contact 65 and the movable terminal 31 are electrically disconnected to each other.

A description will be provided of a communication apparatus according to a second preferred embodiment of the present invention by using an example of a mobile phone.

Figure 11:
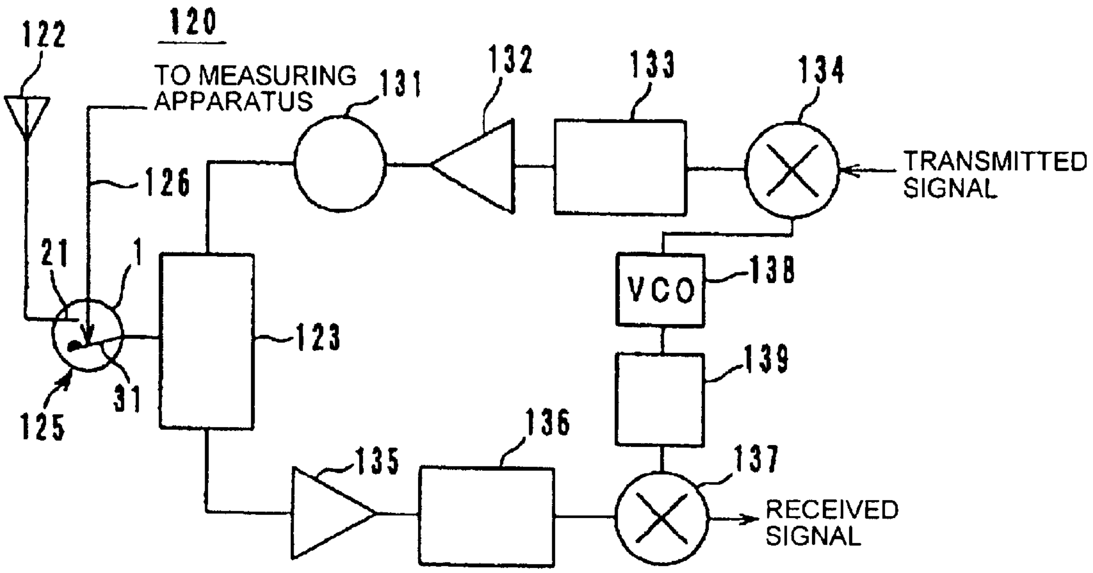
FIG. 11 is a block diagram of a preferred embodiment of a communication apparatus according to the present invention.

FIG. 11 shows an electric-circuit block diagram of an RF circuit of a mobile phone 120. In FIG. 11, reference numeral 122 denotes an antenna element, reference numeral 123 denotes a duplexer, reference numeral 125 denotes a selector switch, reference numeral 131 denotes a transmission-side isolator, reference numeral 132 denotes a transmission-side amplifier, reference numeral 133 denotes transmission-side interstage band pass filter, reference numeral 134 denotes a transmission-side mixer, reference numeral 135 denotes a reception-side amplifier, reference numeral 136 denotes a reception-side interstage band pass filter, reference numeral 137 denotes a reception-side mixer, reference numeral 138 denotes a voltage-controlled oscillator (VCO), and reference numeral 139 denotes a local band pass filter.

In this case, the coaxial connector 1 in accordance with the first preferred embodiment is used as the selector switch 125. With this arrangement, for example, when the electrical characteristics of the RF circuit are checked in a process for manufacturing the mobile phone 120, by fitting a measurement probe (the counterpart coaxial connector) 126 connected to a measuring apparatus into the coaxial connector 1, a signal path from the RF circuit to the antenna element 122 is switched to a signal path from the RF circuit to the measuring apparatus. When the measurement probe 126 is removed from the coaxial connector 1, the signal path from the RF circuit to the measuring apparatus is again switched to the signal path from the RF circuit to the antenna element 122. With the installation of the coaxial connector 1, the mobile phone 120 obtains greatly increased reliability.

The movable terminal, the coaxial connector, and the communication apparatus in accordance with the present invention are not restricted to the above preferred embodiments. Various modifications and changes can be made without departing from the scope of the invention.

In the above-described preferred embodiments, the coaxial connector is preferably formed by separately producing terminals and insulating cases. However, the coaxial connector may be formed by integrally insert-molding the terminals in the insulating cases. In addition, the outline of the insulating cases and the configuration of the cavity may be arbitrarily selected according to specifications. For example, they may have substantially rectangular or round shapes.

Furthermore, terminals used in the present invention are not restricted to surface-mount type terminals. Insert-mount terminals may be used. In addition, after separately producing the movable contact portion of the movable terminal, the fixed portion, and the lead portion, these components may be connected to each other by welding or other suitable methods.

As described above, in the present invention, the movable terminal includes the frame-shaped portion. The two arms of the frame-shaped portion are bent and the spring movable portion is curved in an arcuate shape. As a result, plastic deformation of the movable terminal does not occur, and the spring property of the movable terminal does not deteriorate. Thus, the coaxial connector and the communication apparatus having greatly improved reliability is achieved.

While the invention has been particularly shown and described with reference to preferred embodiments thereof, it will be understood by those skilled in the art that the foregoing and other changes in form and details can be made without departing from the spirit and scope of the invention.

What is claimed is:

1. A movable terminal comprising:

a frame-shaped portion including at least two arms;

a spring movable portion having two ends supported by the frame-shaped portion and having a displaceable spring central portion; and a contact portion integrally provided with the spring movable portion and contacting a fixed terminal such that the contact portion is connected to the fixed terminal;

wherein the at least two arms are arranged such that a longitudinal dimension thereof extends in a direction substantially parallel to a longitudinal dimension of the spring movable portion.

2. A movable terminal according to claim 1, wherein the contact portion is provided on the top of the spring movable portion having the curved arcuate shape.

3. A movable terminal according to claim 1, further comprising a fixed portion connected to said frame-shaped portion.

4. A movable terminal according to claim 3, wherein said fixed portion includes a lead portion.

5. A movable terminal according to claim 4, wherein said lead portion is bent to have a substantially L-shaped configuration.

6. A movable terminal according to claim 1, wherein said frame-shaped portion includes at least two spring supporting portions arranged to connect said spring movable portion thereto.

7. A movable terminal according to claim 6, wherein said at least two spring supporting portions extend in a direction substantially perpendicular to said spring movable portion.

8. A coaxial connector comprising:

an insulating case having a cavity in which an approximately central contact of a counterpart coaxial connector is inserted;

a movable terminal including:

a frame-shaped portion including at least two arms;

a spring movable portion having two ends supported by the frame-shaped portion and having a displaceable spring central portion; and a contact portion integrally provided with the spring movable portion and contacting a fixed terminal such that the contact portion is connected to the fixed terminal;

wherein the at least two arms are arranged such that a longitudinal dimension thereof extends in a direction substantially parallel to a longitudinal dimension of the spring movable portion, the movable terminal is disposed in the cavity of the insulating case such that the movable terminal protrudes in a direction substantially perpendicular to a direction in which the approximately central contact is inserted;

a fixed terminal disposed in the cavity of the insulating case to make contact with the contact portion of the movable terminal such that the fixed terminal is connected to the contact portion; and an external terminal disposed on the outside of the insulating case to electrically connect an external conductor of the counterpart coaxial connector;

wherein the contact portion of the movable terminal and the fixed terminal separate from each other and make contact to connect to each other in accordance with the installation and removal of the counterpart coaxial connector.

9. A coaxial connector according to claim 8, wherein said insulating case includes a lower insulating case and an upper insulating case.

10. A coaxial connector according to claim 9, wherein said lower insulating case includes guide protrusions provided at two corners on one side thereof to position the upper insulating case on said lower insulating case.

11. A coaxial connector according to claim 9, wherein said lower insulating case includes leg-receiving portions for fitting said upper insulating case on said lower insulating case.

12. A coaxial connector according to claim 9, wherein said lower insulating case includes substantially rectangular cut-away portions at approximately central portions of mutually opposing edges of said lower insulating case to accommodate a lead portion of said fixed terminal and a lead portion of said movable terminal.

13. A coaxial connector according to claim 12, wherein said substantially rectangular cut-away portions are configured to provide sufficient clearance to prevent capillary effect due to the flux of solder used to mount said lead portions to said lower insulating case.

14. A coaxial connector according to claim 9, wherein said upper insulating case includes a groove extending substantially perpendicular to a direction in which the fixed terminal is led out to an edge of said coaxial connector.

15. A coaxial connector according to claim 14, wherein said groove is substantially V-shaped.

16. A coaxial connector according to claim 8, wherein said fixed terminal includes a lead portion.

17. A coaxial connector according to claim 16, wherein said lead portion of said fixed terminal is bent into a substantially L-shaped configuration.

18. A coaxial connector according to claim 11, wherein said fixed terminal includes at least two holes which overlap said cavity-like leg-receiving portions of said lower insulating case.

19. A coaxial connector according to claim 18, wherein said at least two holes include a round hole and an oval hole.

20. A communication apparatus comprising the coaxial connector according to claim 8.

* * * * *